US012525249B2

(12) United States Patent
Kain

(10) Patent No.: US 12,525,249 B2
(45) Date of Patent: Jan. 13, 2026

(54) ROLLED ASYMMETRIC TRAPEZOIDAL SYNTHESIS WINDOW FOR LOWERING DIGITAL SIGNAL PROCESSING LATENCIES

(71) Applicant: SKYWORKS SOLUTIONS, INC., Irvine, CA (US)

(72) Inventor: Alexander Kain, Portland, OR (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 165 days.

(21) Appl. No.: 18/581,650

(22) Filed: Feb. 20, 2024

(65) Prior Publication Data

US 2024/0290336 A1 Aug. 29, 2024

Related U.S. Application Data

(60) Provisional application No. 63/487,464, filed on Feb. 28, 2023.

(51) Int. Cl.
*G10L 21/0208* (2013.01)

(52) U.S. Cl.
CPC ................................ *G10L 21/0208* (2013.01)

(58) Field of Classification Search
CPC .................................................. G10L 21/0208
USPC ........................................................... 381/94
See application file for complete search history.

(56) References Cited

U.S. PATENT DOCUMENTS

2012/0123771 A1* 5/2012 Chen .................. G10L 21/0272 704/226
2014/0363005 A1* 12/2014 Konchitsky ......... G10L 21/0364 381/58
2015/0281853 A1* 10/2015 Eisner .................. H04R 25/505 381/312

* cited by examiner

*Primary Examiner* — Yogeshkumar Patel
(74) *Attorney, Agent, or Firm* — Lando & Anastasi, LLP

(57) ABSTRACT

Techniques for frame-based noise reduction and other signal processing techniques are provided that are able to reduce latency below the frame length. This may be accomplished by using an asymmetric trapezoidal (or quasi-trapezoidal) filter. Instead of cross-fading between successive frames taking up half the frame length, the cross-fading between successive frames is reduced to 10-25% of the frame length, for example. This allows the latency to be reduced to 60-75% of the frame length (plus the signal processing time) instead of the full frame length (plus the signal processing time) in prior techniques.

20 Claims, 4 Drawing Sheets

300
302
304
306
308
1.0
0.8
0.6
0.4
0.2
0.0
0
200
400
600
800
1000

300′
302
304
306
308
310
1.0
0.8
0.6
0.4
0.2
0.0
0
200
400
600
800
1000

300″
302
304
306
308
1.0
0.8
0.6
0.4
0.2
0.0
0
25
50
75
100
125
150
175
200

ROLLED ASYMMETRIC TRAPEZOIDAL SYNTHESIS WINDOW FOR LOWERING DIGITAL SIGNAL PROCESSING LATENCIES

CROSS REFERENCE TO RELATED APPLICATIONS

The present application claims priority to Provisional Patent Application No. 63/487,464, filed Feb. 28, 2023, and titled "ROLLED ASYMMETRIC TRAPEZOIDAL SYNTHESIS WINDOW FOR LOWERING DIGITAL SIGNAL PROCESSING LATENCIES," the disclosure of which is hereby incorporated by reference herein in its entirety for all purposes.

BACKGROUND

It is often advantageous to process digital audio signals and other digital signals in real-time. For example, an audio input signal may be processed to remove noise as the signal is received at one or more microphones and played on local speakers or headphones and/or transmitted across a network for real-time audio or audiovisual communications. Since most noise reduction and other signal processing techniques require conversion of time-varying signals into the frequency domain (e.g., using a Fast Fourier Transform), the input signal must be divided up into frames (e.g., on the order of 10-100 milliseconds (ms)).

Division into frames introduces the potential for discontinuities if the signal processing used between frames is significantly different. In order to combat this discontinuity issue, many systems utilize overlapping frames with triangular or quasi-triangular filtering and cross-fading. The latter half of each frame is cross-faded with the earlier half of the next frame, weighted more heavily towards the earlier frame at first and then more heavily towards the next frame.

SUMMARY

Unfortunately, conventional techniques utilizing overlapping frames with triangular or quasi-triangular filtering and cross-fading introduce a latency of at least the frame length (plus the signal processing time). However, decreasing the frame length without bounds is not a good option for speech processing because signal quality is degraded when the frames get too small, especially when they decrease below about 10 ms, the duration of a pitch period of a low-pitched speaker. Nevertheless, even a delay of 10 ms is noticeable and may be bothersome to users, especially in a multimodal context when video/view of the speaker is also available, such as in the hearing aid context.

Thus, it would be desirable to employ techniques for frame-based noise reduction and other signal processing techniques that are able to reduce latency below the frame length. This may be accomplished by using an asymmetric trapezoidal (or quasi-trapezoidal) filter. Instead of the cross-fading between successive frames taking up half the frame length, the cross-fading between successive frames is reduced to 10-25% of the frame length, for example. This allows the latency to be reduced to 60-75% of the frame length (plus the signal processing time) instead of the full frame length (plus the signal processing time) in prior techniques.

A signal processing method is provided according to some embodiments, including: (1) receiving a time-varying signal; (2) dividing the time-varying signal into a plurality of overlapping windows each having a beginning and an end, the end of a first window overlapping the beginning of a second window, and the end of the second window overlapping the beginning of a third window; (3) performing a signal processing operation on the time-varying signal of each of the first, second, and third windows, respectively yielding a first processed window signal, a second processed window signal, and a third processed window signal; (4) filtering each of the first, second, and third processed window signals with a quasi-trapezoidal filter, the quasi-trapezoidal filter including a first portion having a zero-pass filter, a second portion having an increasing-pass filter, a third portion having a full-pass filter, and a fourth portion having a decreasing-pass filter, the second portion and the fourth portion having equal time lengths; (5) rendering on an output device, responsive to filtering the first processed window signal, the portion of the first processed window signal filtered by the third portion of the quasi-trapezoidal filter; and (6) rendering on the output device, responsive to filtering the second processed window signal, (i) the portion of the first processed window signal filtered by the fourth portion of the quasi-trapezoidal filter summed with the portion of the second processed window signal filtered by the second portion of the quasi-trapezoidal filter followed by (ii) the portion of the second processed window signal filtered by the third portion of the quasi-trapezoidal filter. A corresponding apparatus, system, and computer program product are also provided.

BRIEF DESCRIPTION OF THE DRAWINGS

The foregoing and other objects, features, and advantages will be apparent from the following description of particular embodiments, as illustrated in the accompanying drawings in which like reference characters refer to the same parts throughout the different views. The drawings are not necessarily to scale, emphasis instead being placed upon illustrating the principles of various embodiments.

DETAILED DESCRIPTION

Figure 1:
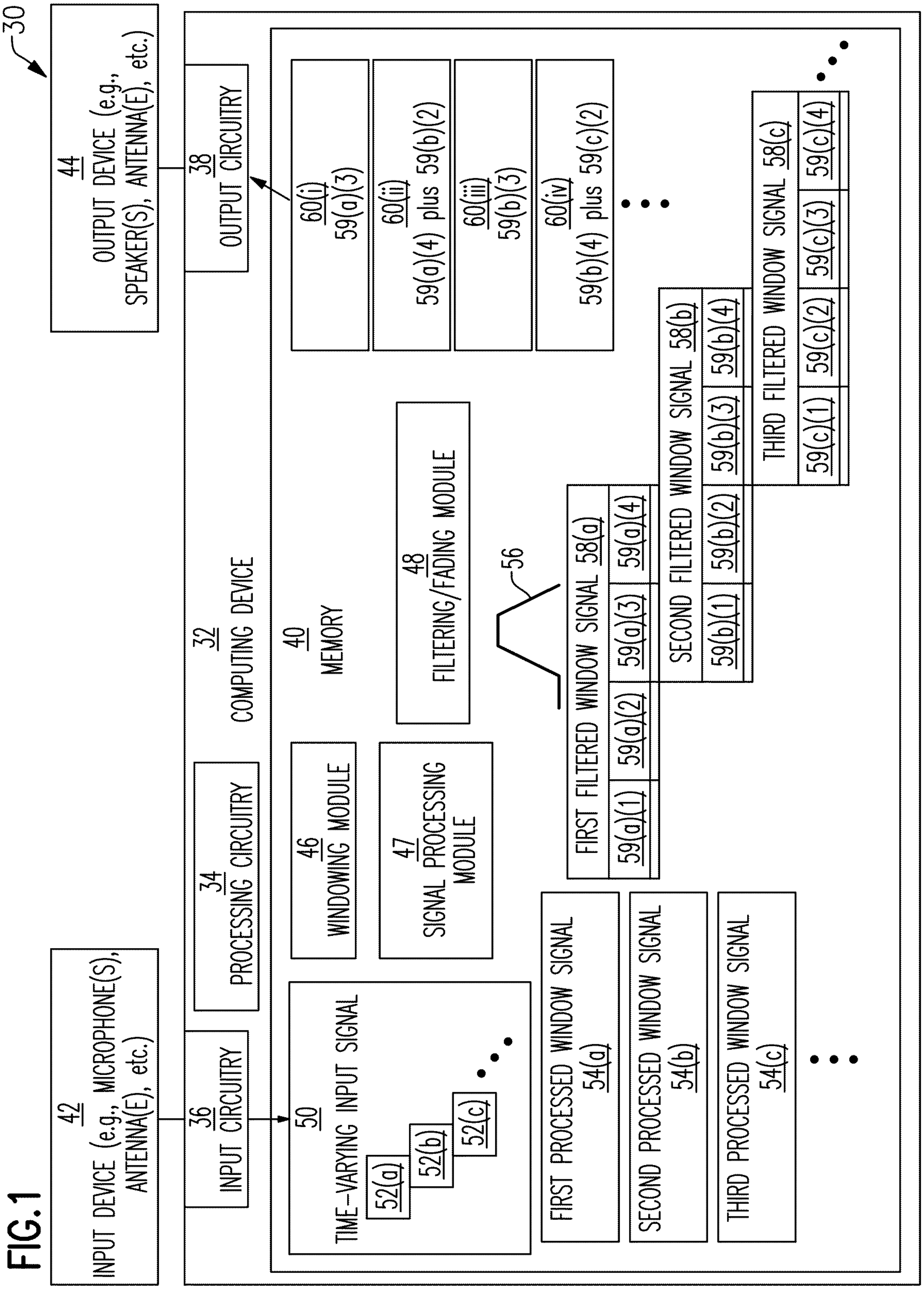
FIG. 1 illustrates an example system, apparatus, computer program product, and data structure arrangement in accordance with one or more embodiments.

FIG. 1 depicts an example system 30 for use in connection with various embodiments. System 30 includes an input device 42, a computing device 32, and an output device 44.

Input device 42 may be any kind of device capable of generating a time-varying input signal 50. For example, in an embodiment, input device 42 may be one or more microphones, and the time-varying input signal 50 may be a digital audio signal having one or more channels. In another example embodiment, input device 42 may be one or more antennae, and the time-varying input signal 50 may be one or more radio signals.

Output device 44 may be any kind of device capable of receiving a time-varying output signal for playback. For example, in an embodiment, output device 44 may be one or more speakers configured to play a digital audio signal having one or more channels. In another example embodiment, output device 45 may be one or more antennae, and the time-varying output signal may be one or more radio signals to be broadcast by the one or more antennae.

Computing device 32 may be any kind of computing device, such as, for example, a personal computer, laptop, workstation, server, enterprise server, tablet, smartphone, etc.

Computing device 32 includes processing circuitry 34, input circuitry 36, output circuitry 38, and memory 40. Computing device 32 may also include various additional features as is well-known in the art, such as, for example, network interface circuitry (e.g., one or more Ethernet cards, cellular modems, Fibre Channel (FC) adapters, InfiniBand adapters, wireless networking adapters, etc.), user interface circuitry, interconnection buses, etc.

Processing circuitry 34 may include any kind of processor or set of processors configured to perform operations, such as, for example, a microprocessor, a multi-core microprocessor, a digital signal processor, a system on a chip (SoC), a collection of electronic circuits, a similar kind of controller, or any combination of the above.

Input circuitry 36 may be any kind of digital interface circuitry configured to communicate with the input device 42, such as, for example, a sound card, an analog-to-digital converter (ADC), a serial or parallel bus port, a USB port, etc.

Output circuitry 38 may be any kind of digital interface circuitry configured to communicate with the output device 44, such as, for example, a sound card, a digital-to-analog converter (DAC), a serial or parallel bus port, a USB port, etc.

Memory 40 may include any kind of digital system memory, such as, for example, random access memory (RAM). Memory 40 stores an operating system (OS, not depicted, e.g., a Linux, UNIX, Windows, MacOS, or similar operating system) and various drivers and other applications and software modules configured to execute on processing circuitry 34 as well as various data.

Memory 40 stores a windowing module 46, a signal processing module 47, and a filtering/fading module 48, which are configured to execute on the processing circuitry 34 of the computing device 32.

In operation, windowing module 46 operates to divide a time-varying input signal 50, received from input device 42 via input circuitry 36, into overlapping window signals 52 (depicted as overlapping window signals 52(*a*), 52(*b*), 52(*c*), . . . ). For example, in one embodiment, each window signal 52 may be 100 ms with a 50 ms overlap between adjacent window signals 52. In other embodiments, window signals 52 may have various lengths, for example, within a range of 10 ms to 200 ms. Typically, the overlap between adjacent window signals 52 is half the length of each window signal 52 in that embodiment. A "window signal" is a portion of the time-varying input signal 50 within a specific window of time.

Signal processing module 47 operates on each window signal 52 once it has been fully received and divided to generate respective processed window signals 54 (depicted as processed window signals 54(*a*), 54(*b*), 54(*c*), . . . ). Signal processing module 47 performs a signal processing operation (e.g., noise reduction) on the window signals 52 to generate the respective processed window signals 54.

Filtering/fading module 48 filters each processed window signal 54 using an asymmetric quasi-trapezoidal filter 56 to generate a respective filtered window signal 58 (depicted as filtered window signals 58(*a*), 58(*b*), 58(*c*), . . . ) and cross-fades portions 59 of those filtered window signal 58 to generate output signal portions 60 (depicted as output signal portions 60(*i*), 60(*ii*), 60(*iii*), 60(*iv*), . . . ) to be sent to the output device 44 via output circuitry 38. Each filtered window signal 58 may be logically divided into several portions 59 based on the shape of the asymmetric quasi-trapezoidal filter 56. As depicted, the asymmetric quasi-trapezoidal filter 56 has a first zero-pass portion, a second increasing-pass portion, a third full-pass portion, and a fourth decreasing-pass portion. Thus, each filtered window signal 58(X) is depicted as being logically divided into four portions 59(X)(1), 59(X)(2), 59(X)(3), 59(X)(4), corresponding to the four portions of the asymmetric quasi-trapezoidal filter 56. As depicted, filtering/fading module 48 outputs the full-pass portion 59(*a*)(3) of first filtered window signal 58(*a*) as output signal portion 60(*i*). Filtering/fading module 48 also outputs a cross-fade of the decreasing-pass portion 59(*a*)(4) of first filtered window signal 58(*a*) and the increasing-pass portion 59(*b*)(2) of second filtered window signal 58(*b*) as output signal portion 60(*ii*). Filtering/fading module 48 then outputs the full-pass portion 59(*b*)(3) of second filtered window signal 58(*b*) as output signal portion 60(*iii*). Filtering/fading module 48 then outputs a cross-fade of the decreasing-pass portion 59(*b*)(4) of second filtered window signal 58(*b*) and the increasing-pass portion 59(*c*)(2) of third filtered window signal 58(*c*) as output signal portion 60(*iv*), and the pattern continues similarly.

Memory 40 may also store various other data structures used by the OS, windowing module 46, signal processing module 47, filtering/fading module 48, and/or various other applications and drivers. In some embodiments, memory 40 may also include a persistent storage portion. Persistent storage portion of memory 40 may be made up of one or more persistent storage devices, such as, for example, magnetic disks, flash drives, solid-state storage drives, or other types of storage drives. Persistent storage portion of memory 40 is configured to store programs and data even while the computing device 40 is powered off. The OS, windowing module 46, signal processing module 47, filtering/fading module 48, and/or various other applications and drivers are typically stored in this persistent storage portion of memory 40 so that they may be loaded into a system portion of memory 40 upon a system restart or as needed. The OS, windowing module 46, signal processing module 47, filtering/fading module 48, and/or various other applications and drivers, when stored in non-transitory form either in the volatile or persistent portion of memory 40, each form a computer program product. The processing circuitry 34 running one or more applications thus forms a specialized circuit constructed and arranged to carry out the various processes described herein.

Figure 2:
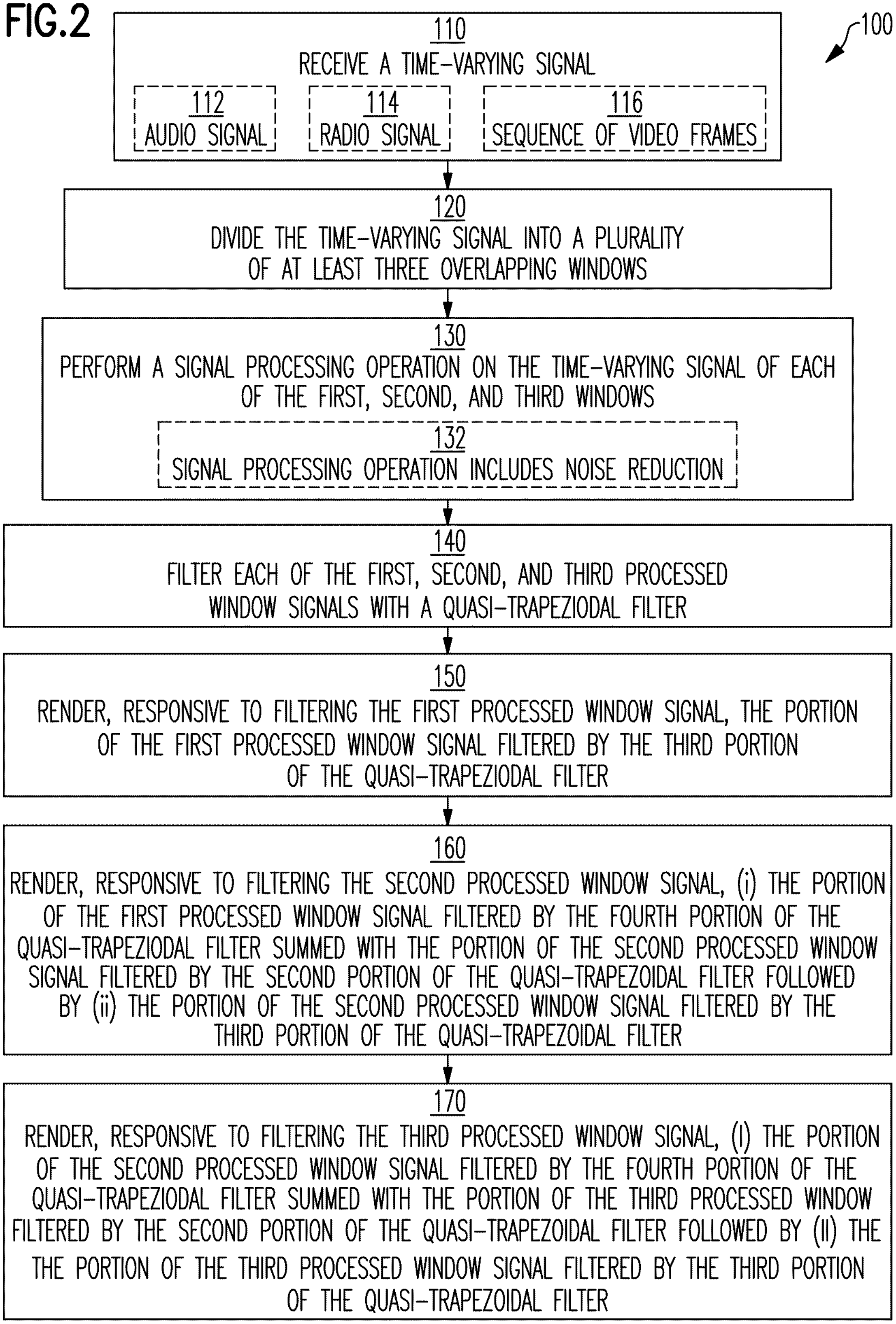
FIG. 2 illustrates an example method in accordance with one or more embodiments.

FIG. 2 illustrates an example method 100 performed by a computing device 32 for frame-based signal processing (e.g., noise reduction). It should be understood that any time a piece of software (e.g., OS, windowing module 46, signal processing module 47, filtering/fading module 48, etc.) is described as performing a method, process, step, or function, what is meant is that a computing device 32 on which that piece of software is running performs the method, process, step, or function when executing that piece of software on its processing circuitry 34. It should be understood that one or more of the steps or sub-steps of method 100 may be omitted in some embodiments. Similarly, in some embodiments, one or more steps or sub-steps may be combined together or performed in a different order.

Method 100 serves to break a time-varying digital signal 50 into a series of overlapping windows 52 and to apply a quasi-trapezoidal filter 56 to each window prior to recombining the filtered overlapping window signals 58 together. This allows a signal processing module 47 to perform signal processing on each individual window 52 with reduced latency compared to the window size in comparison to prior art techniques.

In step 110, computing device 32 receives time-varying input signal 50 from input device 42 via input circuitry 36. In some embodiments (sub-step 112), time-varying input signal 50 is an audio signal. In other embodiments (sub-step 114), time-varying input signal 50 is a radio signal. In other embodiments (sub-step 116), time-varying input signal 50 is a sequence of video frames. In some embodiments, time-varying input signal 50 may include multiple signals in parallel, such as an audiovisual signal or a stercophonic audio signal.

In step 120, windowing module 46 divides the time-varying input signal 50 into a plurality of overlapping windows 52 each having a beginning and an end, the end of a first window 52(*a*) overlapping the beginning of a second window 52(*b*), and the end of the second window 52(*b*) overlapping the beginning of a third window 52(*c*).

Figure 3:
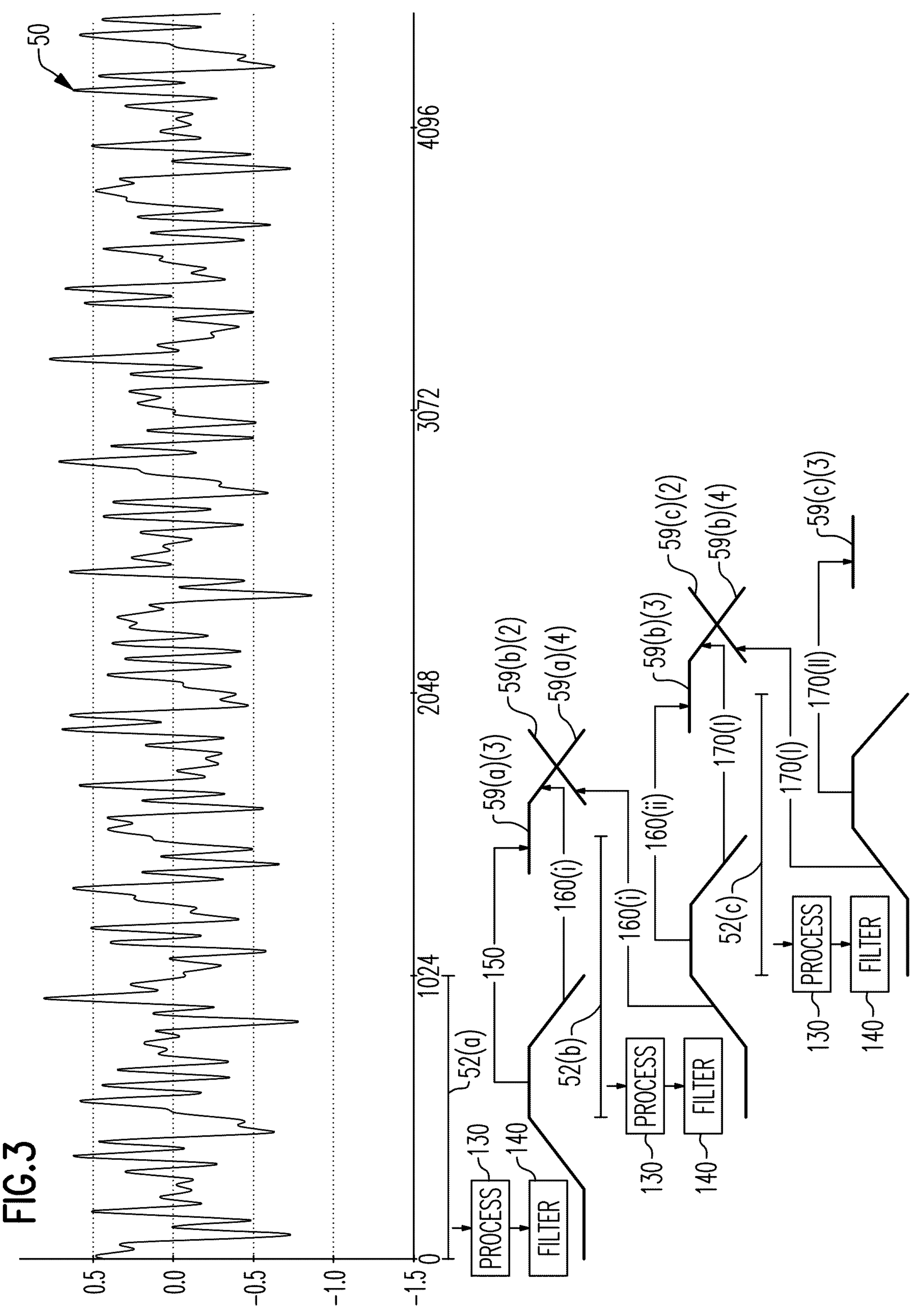
FIG. 3 illustrates an example data structure arrangement and sequence for use in connection with one or more embodiments.

With reference to FIG. 3, time-varying input signal 50 is depicted as a monophonic audio signal sampled at 16 kHz with a window length of 1024 audio samples or 64 ms. Thus, window signal 52(*a*) has 1024 samples, covering time period from 0 to 64 ms, window signal 52(*b*) has 1024 samples, covering time period from 32 to 96 ms, and window signal 52(*c*) has 1024 samples, covering time period from 64 to 128 ms.

In step 130, signal processing module 47 performs a signal processing operation on the time-varying signal of each of the first, second, and third windows, 52(*a*), 52(*b*), 52(*c*), respectively yielding a first processed window signal 54(*a*), a second processed window signal 54(*b*), and a third processed window signal 54(*c*). In some embodiments (sub-step 132), the signal processing operation is a noise reduction operation (e.g., comparing multiple audio channels to remove unwanted noise).

Figure 4A:
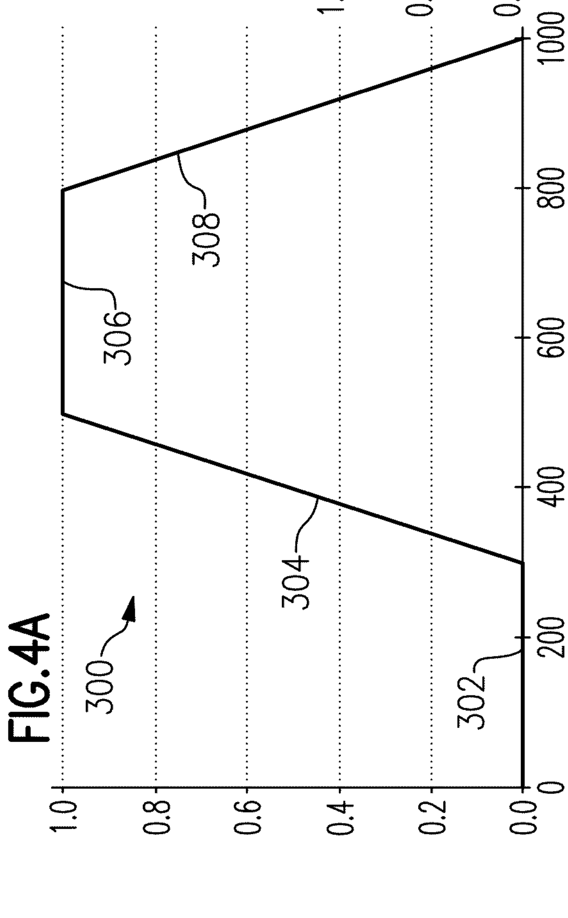
FIGS. 4A-4B illustrate example asymmetric trapezoidal filters for use in connection with one or more embodiments.
Figure 4B:
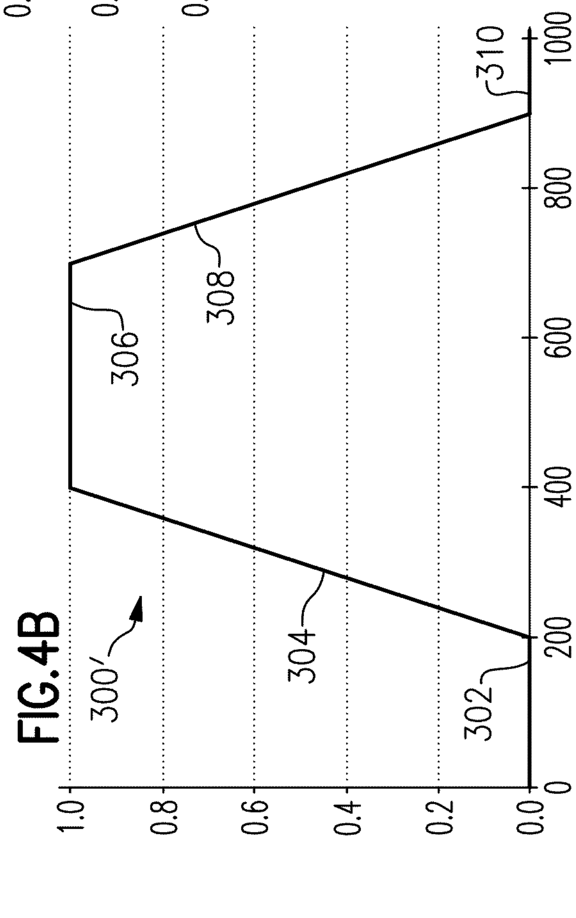
Figure 4C:
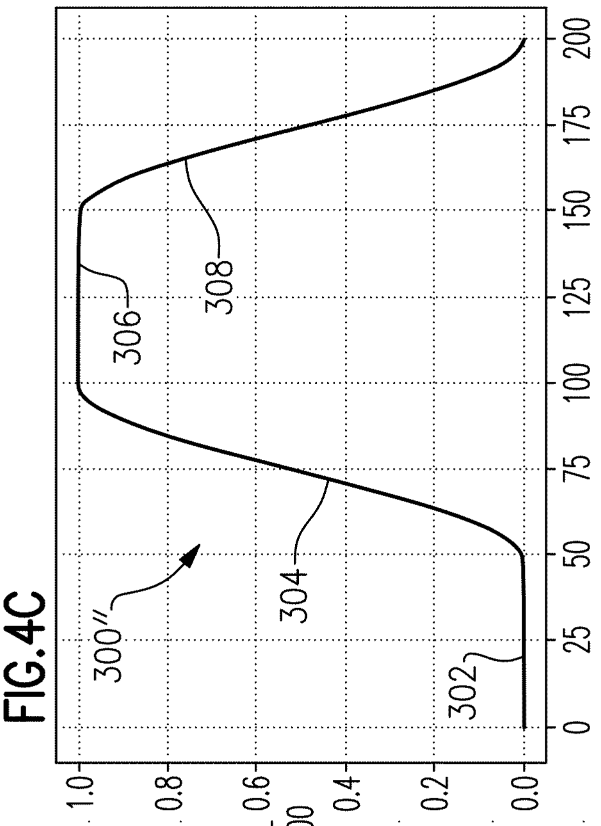
FIG. 4C illustrates an example asymmetric quasi-trapezoidal filter for use in connection with one or more embodiments.

In step 140, filtering/fading module 48 filters each of the first, second, and third processed window signals 54(*a*), 54(*b*), 54(*c*) with a quasi-trapezoidal filter 56, the quasi-trapezoidal filter 56 including a first portion 302 (see FIGS. 4A-4C) having a zero-pass filter, a second portion 304 having an increasing-pass filter, a third portion 306 having a full-pass filter, and a fourth portion 308 having a decreasing-pass filter, the second portion 304 and the fourth portion 308 having equal time lengths. In some embodiments (e.g., in arrangements 300 of FIG. 4A and 300" of FIG. 4C), the first portion 302 and the third portion 306 also have equal time lengths (typically longer than the time length of portions 304, 308). In other embodiments (e.g., in arrangement 300' of FIG. 4B), the third portion 306 is equal in time length to a combination of the first portion 302 and a fifth portion 310 also having a zero-pass filter. Quasi-trapezoidal filter 56 is described as being "quasi" trapezoidal because the increasing-pass and decreasing pass portions 304, 308 may either be linear (in which case it is actually trapezoidal, as in FIGS. 4A and 4B) or non-linear (in which case it is not strictly trapezoidal). FIG. 4C depicts an example quasi-trapezoidal filter 56 with non-linear increasing-pass and decreasing pass portions 304, 308.

The time length of each of the second portion 304 and the fourth portion 308 varies between 10% and 25% of the entire time length of each window signal 52, depending on the embodiment. Thus, the time length of the fourth portion 308 (and also either the first portion 302 or the combination of portions 302, 310) varies between 25% and 40% of the entire time length of each window signal 52, depending on the embodiment.

In step 150, filtering/fading module 48 causes to be rendered on output device 44, responsive to filtering the first processed window signal 54(*a*), the portion 59(*a*)(3) of the first processed window signal 54(*a*) filtered by the third portion 306 of the quasi-trapezoidal filter 56.

As depicted in FIG. 3, portion 59(*a*)(3) of the first processed window signal 54(*a*) is rendered (step 150) beginning before the second window signal 52(*b*) has been completely received as part of the time-varying input signal 50. If, as depicted in FIG. 3, time periods 302, 304, 306, 308 are all equal (i.e., 25% of the entire time length of each window signal 52), then there is a latency between input and output of at least 75% of the entire time length of each window signal 52 (i.e., at least 48 ms if the entire time length of each window signal 52 is 64 ms), which means that portion 59(*a*)(3) of the first processed window signal 54(*a*) can begin to be rendered up to 16 ms before the second window signal 52(*b*) has been completely received as part of the time-varying input signal 50, if the signal processing time and other delays are negligible.

The minimum (i.e., algorithmic) latency is given by 50% of the entire time length of each window signal 52 plus the time length of the second portion 304 (or the fourth portion 308) of the quasi-trapezoidal filter 56. Thus, for example, if the second portion 304 and the fourth portion 308 of the quasi-trapezoidal filter 56 are each 20% of the entire time length of each window signal 52, then the minimum latency is 70% of the entire time length of each window signal 52. It should be understood that the total actual latency is typically longer than the algorithmic latency, exceeding that value by the signal processing time and possibly other small delays, depending on the implementation.

Even if the signal processing time causes portion 59(*a*)(3) of the first processed window signal 54(*a*) to begin to be rendered after the second window signal 52(*b*) has been completely received, portion 59(*a*)(3) of the first processed window signal 54(*a*) should still begin to be rendered prior to the second processed window signal 54(*b*) completing its signal processing by the minimum latency.

In step 160, filtering/fading module 48 causes to be rendered on output device 44, responsive to filtering the second processed window signal 54(*b*), (*i*) the portion 59(*a*)(4) of the first processed window signal 54(*a*) filtered by the fourth portion 308 of the quasi-trapezoidal filter 56 summed with the portion 59(*b*)(2) of the second processed window signal 54(*b*) filtered by the second portion 304 of the quasi-trapezoidal filter 56 followed by (ii) the portion 59(*b*)(3) of the second processed window signal 54(*b*) filtered by the third portion 306 of the quasi-trapezoidal filter 56. Steps 160(*i*), 160(*ii*) are illustrated in the example of FIG. 3 as well.

In step 170, filtering/fading module 48 causes to be rendered on output device 44, responsive to filtering the third processed window signal 54(*c*), (I) the portion 59(*b*)(4) of the second processed window signal 54(*b*) filtered by the fourth portion 308 of the quasi-trapezoidal filter 56 summed with the portion 59(*c*)(2) of the third processed window signal 54(*c*) filtered by the second portion 304 of the quasi-trapezoidal filter 56 followed by (II) the portion 59(*c*)(3) of the third processed window signal 54(*c*) filtered by the third portion 306 of the quasi-trapezoidal filter 56. Steps 170(I), 170(II) are illustrated in the example of FIG. 3 as well.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "background" or as "conventional," Applicants make no admission that such technique, method, apparatus, or other concept is actually prior art under 35 U.S.C. § 102 or 103, such determination being a legal determination that depends upon many factors, not all of which are known to Applicants at this time.

What is claimed is:

1. A signal processing method comprising:
receiving a time-varying signal;
dividing the time-varying signal into a plurality of overlapping windows each having a beginning and an end, the end of a first window overlapping the beginning of a second window, and the end of the second window overlapping the beginning of a third window;
performing a signal processing operation on the time-varying signal of each of the first, second, and third windows, respectively yielding a first processed window signal, a second processed window signal, and a third processed window signal;
filtering each of the first, second, and third processed window signals with a quasi-trapezoidal filter, the quasi-trapezoidal filter including a first portion having a zero-pass filter, a second portion having an increasing-pass filter, a third portion having a full-pass filter, and a fourth portion having a decreasing-pass filter, the second portion and the fourth portion having equal time lengths;
rendering on an output device, responsive to filtering the first processed window signal, the portion of the first processed window signal filtered by the third portion of the quasi-trapezoidal filter; and
rendering on the output device, responsive to filtering the second processed window signal, (i) the portion of the first processed window signal filtered by the fourth portion of the quasi-trapezoidal filter summed with the portion of the second processed window signal filtered by the second portion of the quasi-trapezoidal filter followed by (ii) the portion of the second processed window signal filtered by the third portion of the quasi-trapezoidal filter.

2. The signal processing method of claim 1 further comprising rendering on the output device, responsive to filtering the third processed window signal, (I) the portion of the second processed window signal filtered by the fourth portion of the quasi-trapezoidal filter summed with the portion of the third processed window filtered by the second portion of the quasi-trapezoidal filter followed by (II) the portion of the third processed window signal filtered by the third portion of the quasi-trapezoidal filter.

3. The signal processing method of claim 1 wherein:
the time-varying signal is a digital audio signal; and
the output device is a speaker.

4. The signal processing method of claim 3 wherein performing the signal processing operation includes performing a noise reduction operation on the digital audio signal.

5. The signal processing method of claim 1 wherein rendering the portion of the first processed window signal filtered by the third portion of the quasi-trapezoidal filter is performed prior to completing performing the signal processing operation on the time-varying signal of the second window.

6. The signal processing method of claim 1 wherein rendering the portion of the first processed window signal filtered by the third portion of the quasi-trapezoidal filter is performed prior to completing receiving the time-varying signal of the second window.

7. The signal processing method of claim 1 wherein the second and fourth portions of the quasi-trapezoidal filter are substantially linear.

8. The signal processing method of claim 1 wherein the second and fourth portions of the quasi-trapezoidal filter are substantially nonlinear.

9. The signal processing method of claim 1 wherein the first portion and the third portion of the quasi-trapezoidal filter have equal time lengths.

10. The signal processing method of claim 1 wherein:
the quasi-trapezoidal filter further includes a fifth portion having a zero-pass filter; and
a time length of the first portion of the quasi-trapezoidal filter plus a time length of the fifth portion of the quasi-trapezoidal filter is equal to a time length of the third portion of the quasi-trapezoidal filter.

11. A computer program product comprising a non-transitory computer-readable medium storing instructions, which, when executed on processing circuitry of a computing device, cause the computing device to:
receive a time-varying signal;
divide the time-varying signal into a plurality of overlapping windows each having a beginning and an end, the end of a first window overlapping the beginning of a second window, and the end of the second window overlapping the beginning of a third window;
perform a signal processing operation on the time-varying signal of each of the first, second, and third windows, respectively yielding a first processed window signal, a second processed window signal, and a third processed window signal;
filter each of the first, second, and third processed window signals with a quasi-trapezoidal filter, the quasi-trapezoidal filter including a first portion having a zero-pass filter, a second portion having an increasing-pass filter, a third portion having a full-pass filter, and a fourth portion having a decreasing-pass filter, the second portion and the fourth portion having equal time lengths;

render on an output device, responsive to filtering the first processed window signal, the portion of the first processed window signal filtered by the third portion of the quasi-trapezoidal filter; and render on the output device, responsive to filtering the second processed window signal, (i) the portion of the first processed window signal filtered by the fourth portion of the quasi-trapezoidal filter summed with the portion of the second processed window signal filtered by the second portion of the quasi-trapezoidal filter followed by (ii) the portion of the second processed window signal filtered by the third portion of the quasi-trapezoidal filter.

12. The computer program product of claim 11, wherein the instructions, when executed on the processing circuitry, further cause the computing device to render on the output device, responsive to filtering the third processed window signal, (I) the portion of the second processed window signal filtered by the fourth portion of the quasi-trapezoidal filter summed with the portion of the third processed window filtered by the second portion of the quasi-trapezoidal filter followed by (II) the portion of the third processed window signal filtered by the third portion of the quasi-trapezoidal filter.

13. The computer program product of claim 11 wherein:

the time-varying signal is a digital audio signal; and the output device is a speaker.

14. The computer program product of claim 13 wherein performing the signal processing operation includes performing a noise reduction operation on the digital audio signal.

15. The computer program product of claim 11 wherein rendering the portion of the first processed window signal filtered by the third portion of the quasi-trapezoidal filter is performed prior to completing performing the signal processing operation on the time-varying signal of the second window.

16. The computer program product of claim 11 wherein rendering the portion of the first processed window signal filtered by the third portion of the quasi-trapezoidal filter is performed prior to completing receiving the time-varying signal of the second window.

17. The computer program product of claim 11 wherein the second and fourth portions of the quasi-trapezoidal filter are substantially linear.

18. The computer program product of claim 11 wherein the second and fourth portions of the quasi-trapezoidal filter are substantially nonlinear.

19. The computer program product of claim 11 wherein the first portion and the third portion of the quasi-trapezoidal filter have equal time lengths.

20. An apparatus comprising:

input circuitry configured to receive a time-varying signal;

processing circuitry coupled to memory configured to:

divide the time-varying signal into a plurality of overlapping windows each having a beginning and an end, the end of a first window overlapping the beginning of a second window, and the end of the second window overlapping the beginning of a third window;

perform a signal processing operation on the time-varying signal of each of the first, second, and third windows, respectively yielding a first processed window signal, a second processed window signal, and a third processed window signal; and filter each of the first, second, and third processed window signals with a quasi-trapezoidal filter, the quasi-trapezoidal filter including a first portion having a zero-pass filter, a second portion having an increasing-pass filter, a third portion having a full-pass filter, and a fourth portion having a decreasing-pass filter, the second portion and the fourth portion having equal time lengths; and output circuitry configured to:

render on an output device, responsive to filtering the first processed window signal, the portion of the first processed window signal filtered by the third portion of the quasi-trapezoidal filter; and render on the output device, responsive to filtering the second processed window signal, (i) the portion of the first processed window signal filtered by the fourth portion of the quasi-trapezoidal filter summed with the portion of the second processed window signal filtered by the second portion of the quasi-trapezoidal filter followed by (ii) the portion of the second processed window signal filtered by the third portion of the quasi-trapezoidal filter.

* * * * *